United States Patent
O'Callaghan et al.

(10) Patent No.: US 7,020,352 B2
(45) Date of Patent: Mar. 28, 2006

(54) PHOTO EXTRACTION TECHNIQUES

(75) Inventors: Aindrais O'Callaghan, Fort Lauderdale, FL (US); Anoop Bhattacharjya, Campbell, CA (US); Hakan Ancin, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 596 days.

(21) Appl. No.: 09/866,051

(22) Filed: May 25, 2001

(65) Prior Publication Data

US 2002/0176120 A1 Nov. 28, 2002

(51) Int. Cl.
*G06K 9/54* (2006.01)

(52) U.S. Cl. ...................... 382/305; 382/264
(58) Field of Classification Search ............. 382/264, 382/305

See application file for complete search history.

(56) References Cited

U.S. PATENT DOCUMENTS

| | | | | |
|---|---|---|---|---|
| 5,337,164 A | * | 8/1994 | Yabe et al. | 358/487 |
| 5,606,375 A | * | 2/1997 | Lee | 348/606 |
| 5,682,441 A | | 10/1997 | Ligtenberg et al. | 382/232 |
| 5,706,457 A | | 1/1998 | Dwyer et al. | 395/349 |
| 5,845,018 A | | 12/1998 | Breish | 382/276 |
| 5,867,277 A | * | 2/1999 | Melen et al. | 358/296 |
| 5,892,850 A | * | 4/1999 | Tsuruoka | 382/240 |
| 5,992,743 A | | 11/1999 | Suemoto et al. | 235/462.05 |
| 6,034,719 A | | 3/2000 | Tazawa et al. | 348/96 |
| 6,041,143 A | | 3/2000 | Chui et al. | 382/232 |
| 6,064,778 A | * | 5/2000 | Pasco et al. | 382/289 |
| 6,148,033 A | * | 11/2000 | Pearlstein et al. | 375/240.16 |
| 6,148,115 A | * | 11/2000 | Mackinnon et al. | 382/266 |
| 6,317,221 B1 | * | 11/2001 | Aikawa et al. | 358/1.9 |

* cited by examiner

*Primary Examiner*—Andrew W. Johns
*Assistant Examiner*—Patrick L. Edwards

(57) ABSTRACT

A photo extraction technique is provided that scans film contained within a holder designed to accommodate that particular size and type of film and generates a low-resolution scan of the film and holder. The low-resolution scan is then processed by detecting the borders of the holder, applying a smoothen filter, detecting edge segments of the image-holding areas in the holder, identifying each of the image-holding areas, determining the orientation of the image-holding areas and correcting the orientation thereof if necessary, and locating each of the individual photos within the image-holding areas. Having identified and extracted the photos, an index page comprising thumbnail images of the photos is generated. From this page, the user can select one or more of the images to be printed or displayed in high-resolution.

47 Claims, 9 Drawing Sheets

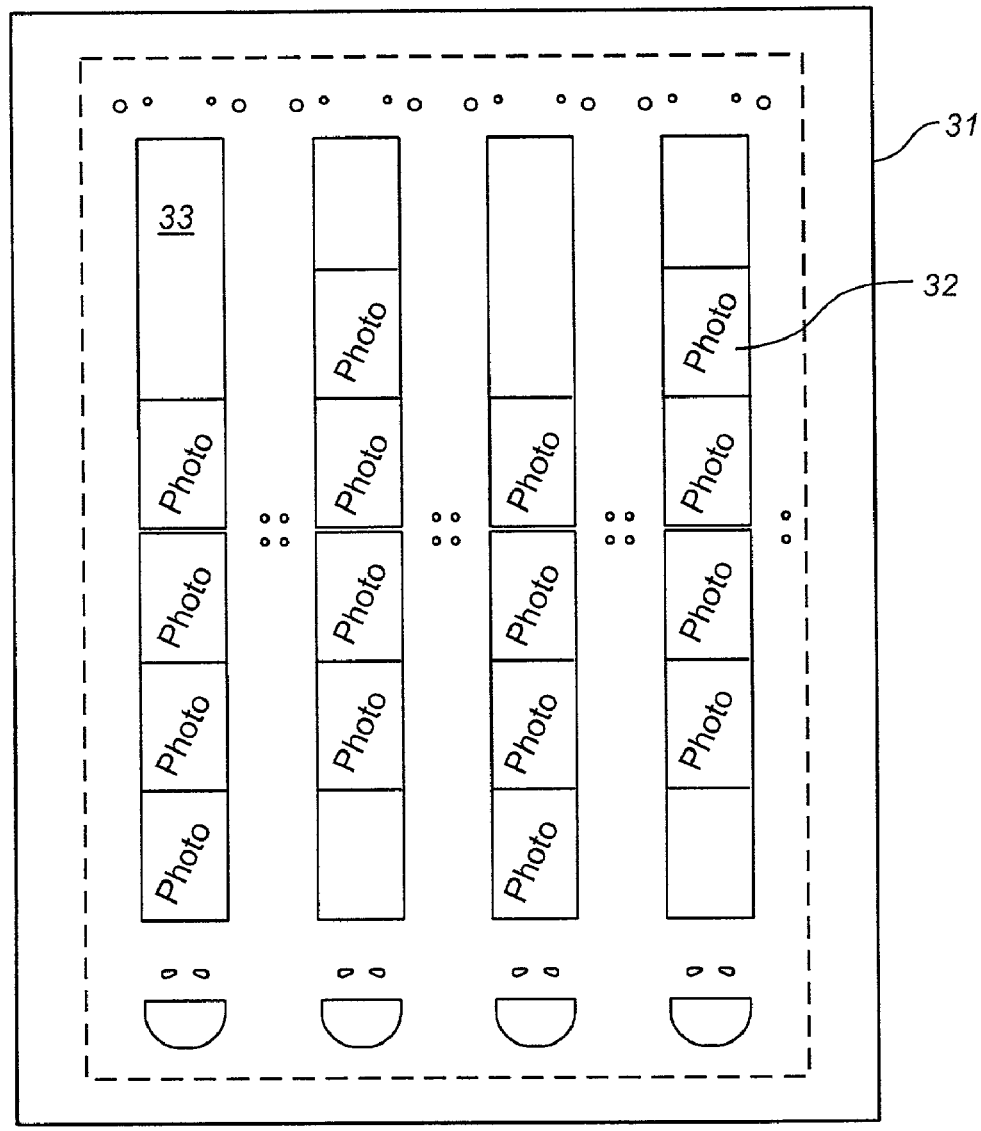
FIG._2

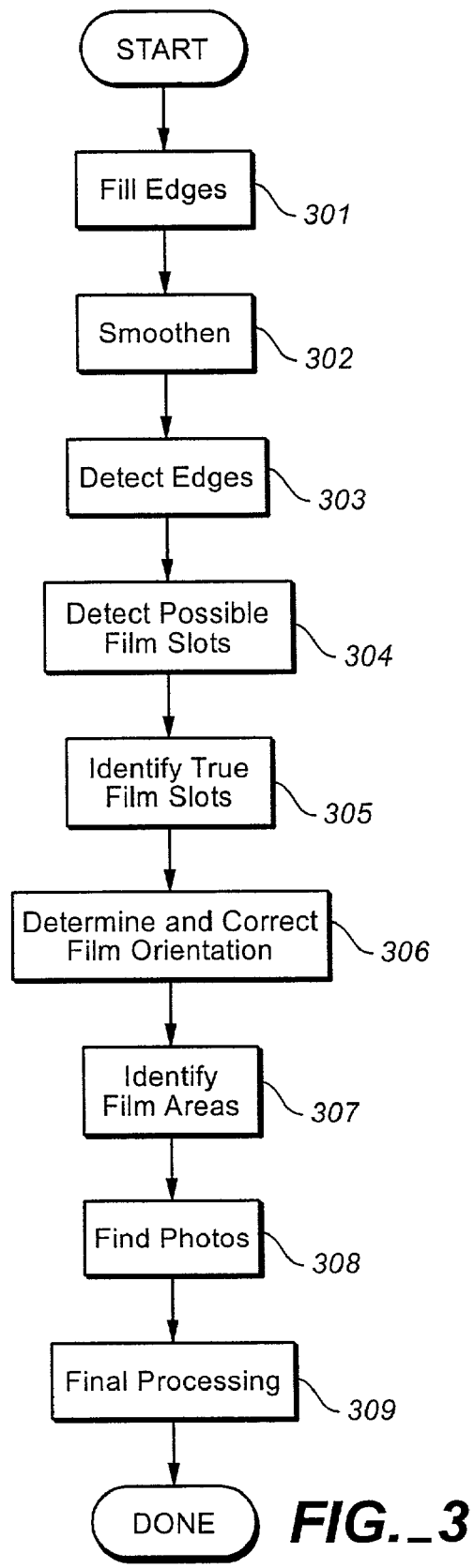
FIG._3

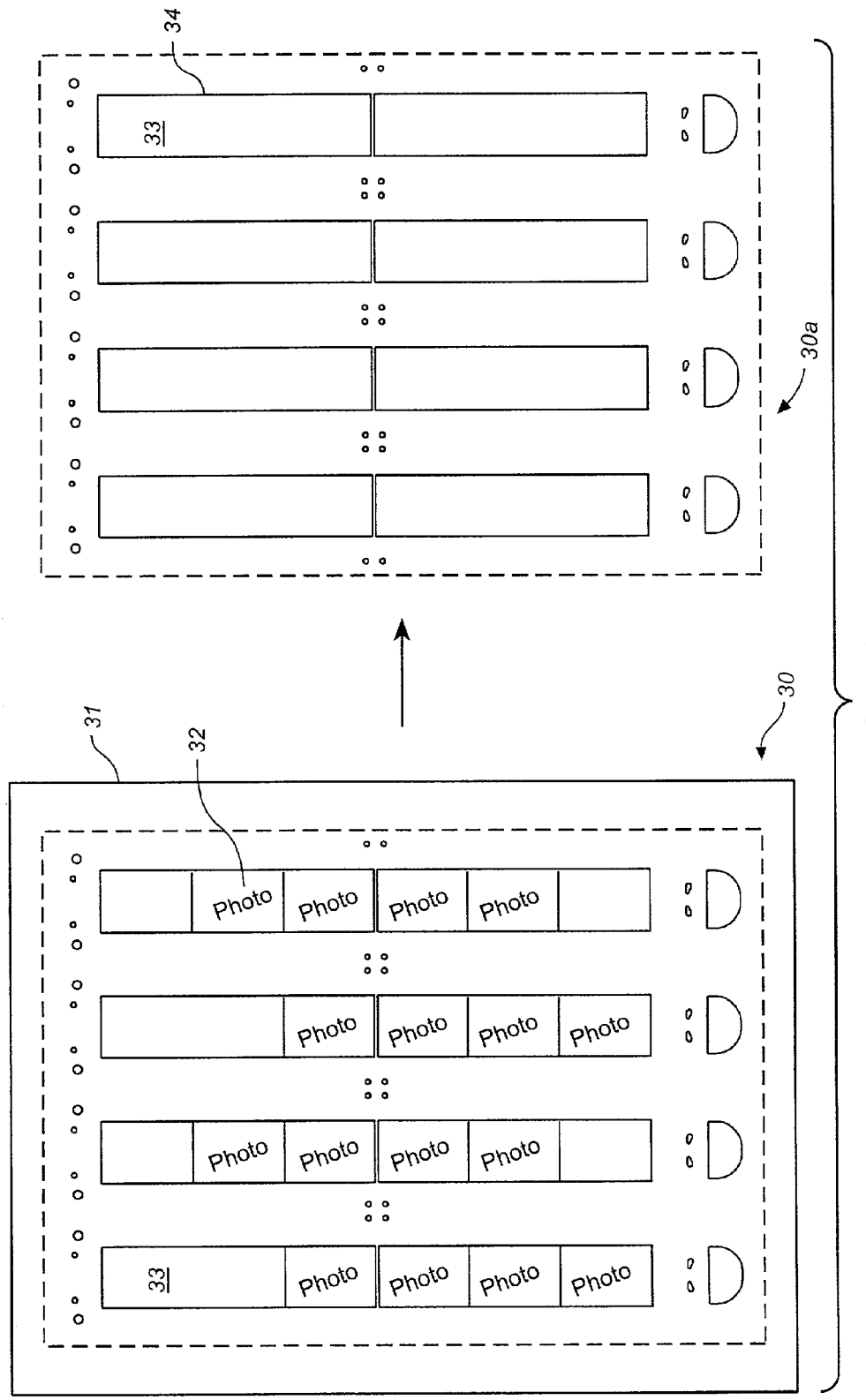
FIG._4

|    |    |    |
|----|----|----|
| -1 | -1 | -1 |
| -1 | 8  | -1 |
| -1 | -1 | -1 |

FIG._5

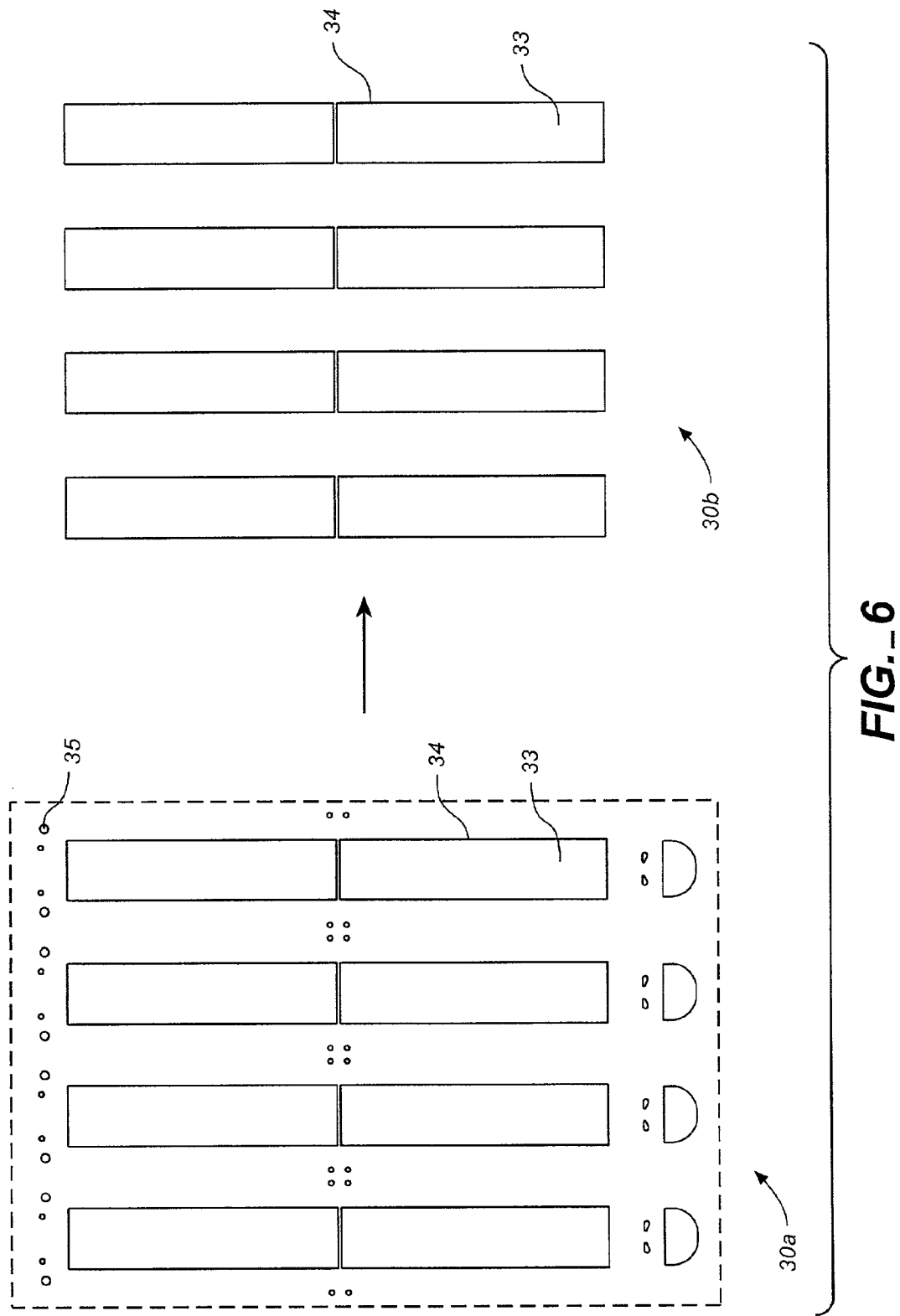
FIG._6

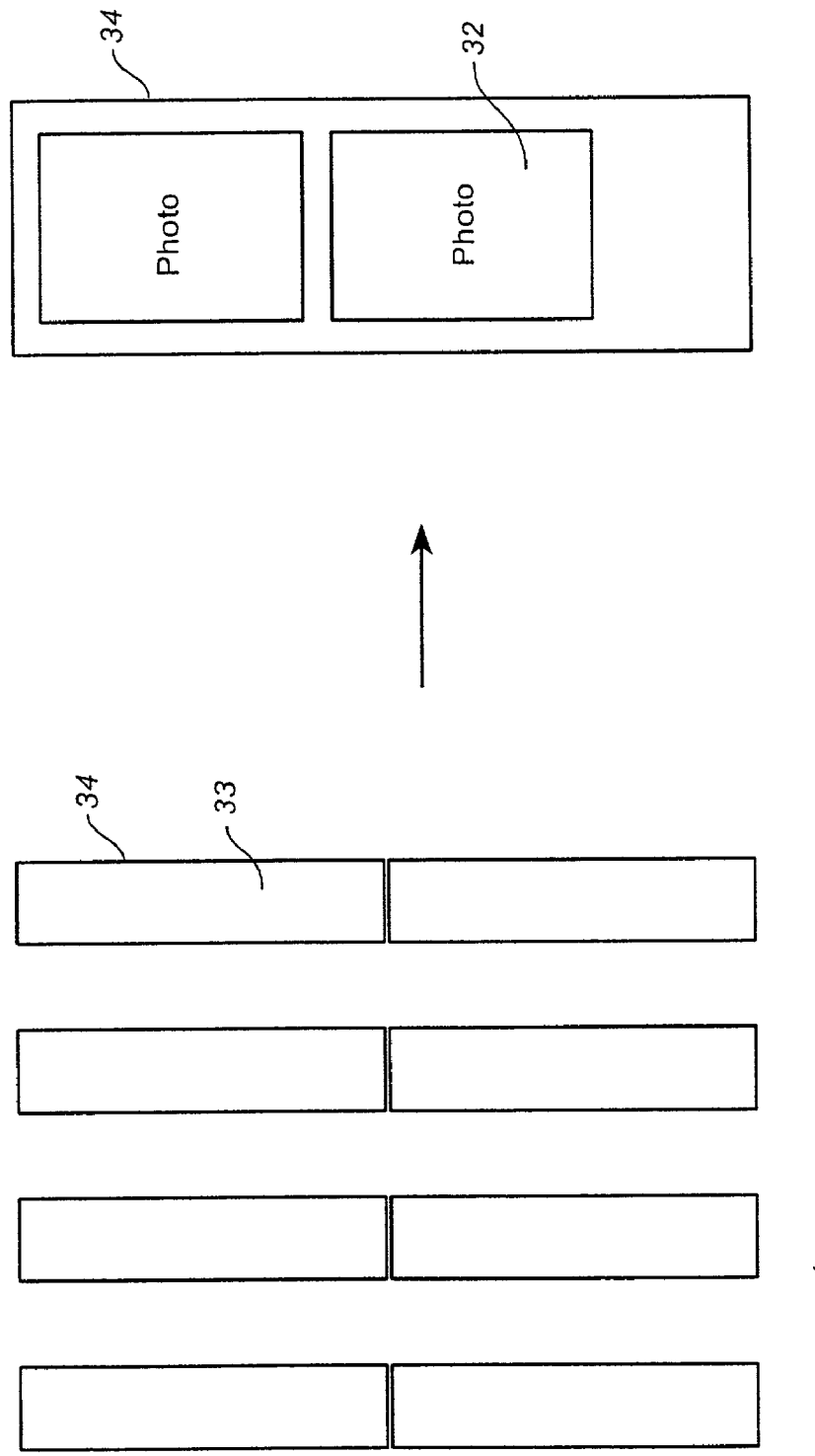
FIG._7

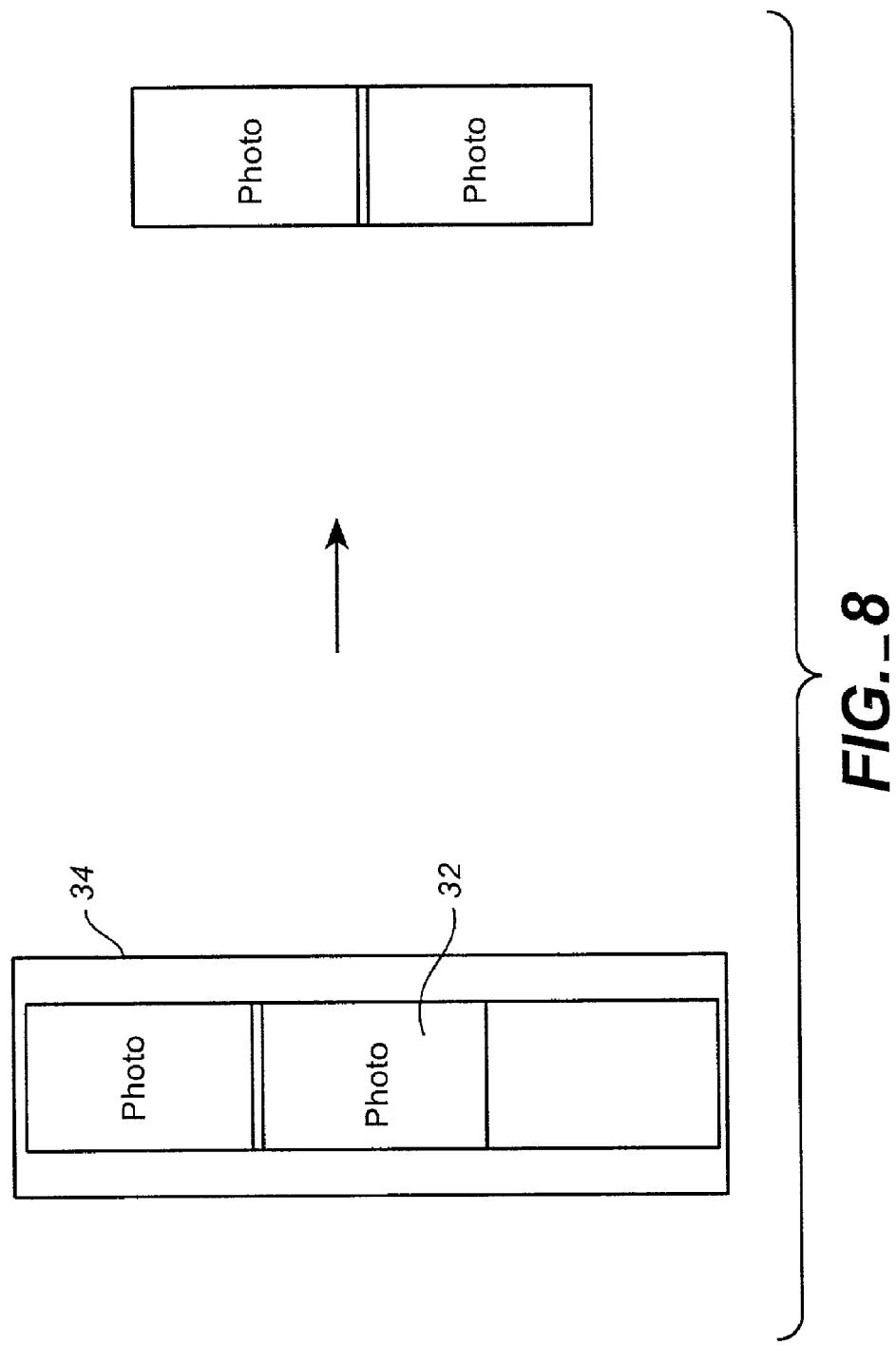
FIG._8

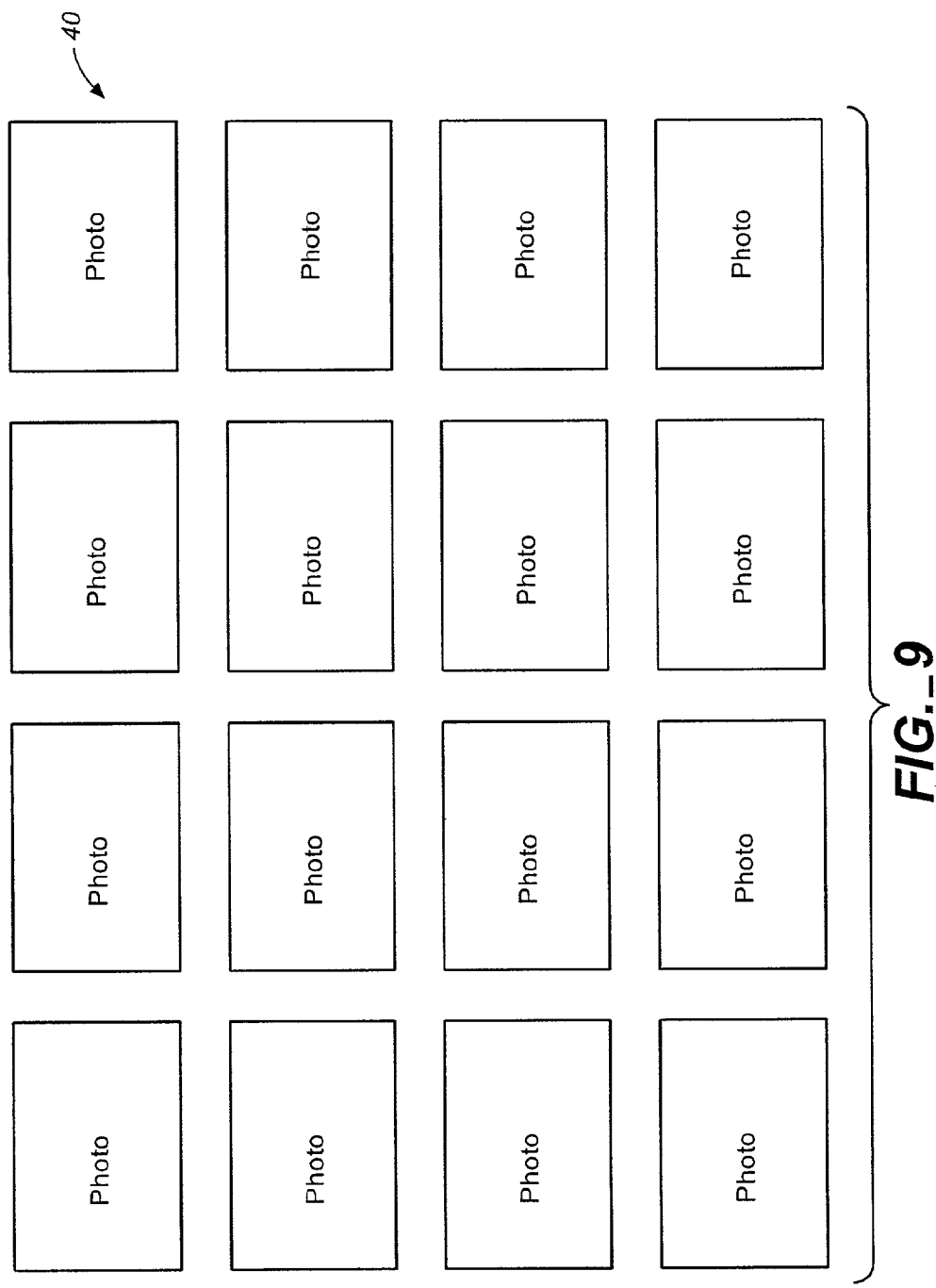
FIG._9

PHOTO EXTRACTION TECHNIQUES

BACKGROUND OF THE INVENTION

1. Field of the Invention

This invention relates to an apparatus and methods for easily and efficiently scanning photos from film and processing the scanned data to enable the user to generate high quality copies for printing or display, as desired. The invention also relates to programs of instructions for implementing various aspects of the photo extraction and processing technique.

2. Description of the Related Art

With the convenience and high quality reproducibility that digital images offer and the increased capability of today's scanners, many people are converting images, such as film or slides (negatives or positives), into digital images to display, print, transmit, store, etc. To do this, a user first places a set of picture frames, e.g. film negatives, in an appropriate template or holder and places the holder on the scanner bed. There are holders for most, if not all, film formats, and there may be more than one type of holder for a given film format. The pictures are then scanned and then reproduced.

The problem is that often the overall process can be somewhat burdensome and time consuming to produce the results that the user wants. Care must be taken to correctly place the pictures in the holders and also to correctly place the holders on the scanner bed. Moreover, sometimes the user may only be interested in certain select frames and therefore may not want to spend the time and resources to generate a high quality reproduction of each frame. The user may simply wish to quickly view all of the frames and then select which of the frames to send to the printer/copier for high quality reproduction.

Conventional systems do not provide an easy and efficient way to handle such processing requirements.

OBJECTS AND SUMMARY OF THE INVENTION

3. Objects of the Invention

Therefore, it is an object of the present invention to overcome the aforementioned problems of conventional systems by providing such an easy and efficient photo extraction technique.

It is another object of this invention to provide a method, apparatus and program of instructions for extracting individual images from a medium contained in a holder having image-holding areas.

4. Summary of the Invention

According to one aspect of this invention, a method for extracting individual images from a medium, such as negative film, positive film or slides, is provided. The method comprises the steps of scanning the medium at a relatively low resolution to generate a low-resolution digital representation of the medium and the individual images thereon; processing the low-resolution digital representation; and generating an index of all individual images identified on the medium. The processing of the low-resolution digital representation includes defining borders of the medium, such that all of the individual images are within the defined borders; applying a smoothen filter to the low-resolution representation; detecting edges of each area containing at least one image; determining, and if necessary correcting, the orientation of the medium; and locating each of the individual images within its corresponding area in the medium.

In another aspect, the invention involves a method for extracting individual images from a medium, such as negative film, positive film or slides, contained in a holder having image-holding areas, comprising the steps of scanning the medium and the holder at a relatively low resolution to generate a low-resolution digital representation of the holder and the medium including the individual images thereon; processing the low-resolution digital representation; and generating an index of all individual images identified on the medium. The processing of the low-resolution digital representation includes defining borders of the holder, such that all of the image-holding areas and all of the individual images contained therein are within the defined borders; applying a smoothen filter to the low-resolution representation; detecting edge segments of the image-holding areas; detecting and identifying each of the image-holding areas; determining the orientation of at least one image-holding area with respect to a reference, and if it is determined that the at least one image-holding area is skewed with respect to the reference, correcting the orientation of the at least one image-holding area; and locating each of the individual images within the image-holding areas.

The method may further comprise selecting one or more of the individual images from the index which may comprise a collection of thumbnail images; re-scanning each of the selected individual images at a relatively high resolution; and generating a high-resolution output of each of the selected individual images.

The border-defining step may comprise darkening pixels in, or within a predetermined distance from, the outer-most row/column of pixels representing the holder.

When the low-resolution digital representation is a RGB color representation, the filter-applying step may comprise applying the smoothen filter to only the R data of each pixel in the low-resolution representation. Preferably, each output pixel of the smoothen filter is determined by the weighted average of the pre-filtered version of that pixel and each of the pixels in a pre-defined neighborhood.

The edge-detecting step may comprise reducing the low-resolution representation to binary data, and then reducing the binary data to boundaries of the image-holding areas. More particularly, the edge-detecting step may comprise applying an edge detector to the low-resolution representation, wherein each output pixel of the edge detector is determined by a pre-defined edge-detecting-filter kernel, and then applying a threshold test to each output pixel to determine whether that output pixel is above or below a pre-determined threshold, and making that output pixel either a 1 or a 0 based on the result of the threshold test.

The detecting and identifying step may comprise distinguishing the detected edge segments of the image-holding areas from all artifacts that resemble an image holding-area edge segment, identifying groups of connected edge segments, and identifying each of the image-holding areas from the size and shape of the corresponding group of connected edge segments.

The orientation-determining step may comprise computing the rotation angle of one or more image-holding area with respect to the reference by computing the Hough transform of a representative line drawing of that image-holding area.

The step of locating individual images may comprise identifying boundaries of the medium in each of the identified image-holding areas, and may further comprise identifying boundaries of each individual image.

Another aspect of the invention involves an apparatus for extracting individual images from a medium, such as negative film, positive film or slides, contained in a holder having image-holding areas. The apparatus comprises a scanner for scanning the medium and the holder at a relatively low resolution to generate a low-resolution digital representation of the holder and the medium including the individual images thereon; a storage medium in communication with the scanner for storing the low-resolution representation; means in communication with the storage medium for processing the low-resolution digital representation; and means for generating an index of all individual images identified on the medium. The processing means includes means for defining borders of the holder, such that all of the image-holding areas and all of the individual images contained therein are within the defined borders; means for applying a smoothen filter to the low-resolution representation; means for detecting edge segments of the image-holding areas; means for detecting and identifying each of the image-holding areas; means for determining the orientation of at least one image-holding area with respect to a reference, and, if it is determined that the at least one image-holding area is skewed with respect to the reference, for correcting the orientation of the at least one image-holding area; and means for locating each of the individual images within the image-holding areas.

The apparatus may further comprise means for selecting one or more of the individual images from the index which may comprise a collection of thumbnail images; and means for generating a high-resolution output of each of the selected individual images wherein the scanner re-scans each of the selected individual images at such a high resolution.

The border-defining means may darken pixels in, or within a predetermined distance from, the outer-most row/column of pixels representing the holder.

When the low-resolution digital representation is a RGB color representation, the smoothen-filter-applying means applies the smoothen filter to only the R data of each pixel in the low-resolution representation. Preferably, each output pixel of the smoothen filter may be determined by the weighted average of the pre-filtered version of that pixel and each of the pixels in a pre-defined neighborhood.

The edge-segments-detecting means may reduce the low-resolution representation to binary data, and then reducing the binary data to boundaries of the image-holding areas. More particularly, the edge-segments-detecting means may apply an edge detector to the low-resolution representation, wherein each output pixel of the edge detector is determined by a pre-defined edge-detecting-filter kernel, and then applying a threshold test to each output pixel to determine whether that output pixel is above or below a pre-determined threshold, and making that output pixel either a 1 or a 0 based on the result of the threshold test. The detecting and identifying means may distinguish the detected edge segments of the image-holding areas from all artifacts that resemble an image-holding-area edge segment, identify groups of connected edge segments, and identify each of the image-holding areas from the size and shape of the corresponding group of connected edge segments.

The orientation-determining-and-correcting means may compute the rotation angle of one or more image-holding area with respect to the reference by computing the Hough transform of a representative line drawing of that image-holding area.

The locating means may identify boundaries of the medium in each of the identified image-holding areas, and may further identify boundaries of each individual image.

In accordance with further aspects of the invention, any of the above-described methods or steps thereof may be embodied in a program of instructions (e.g., software) which may be stored on, or conveyed to, a computer or other processor-controlled device for execution. Alternatively, any of the methods or steps thereof may be implemented using functionally equivalent hardware components, or a combination of software and hardware.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIG. 2 is a top view of a standard film holder with negative film contained in film-holding areas of the film holder.

FIG. 3 is a flow diagram showing the steps of the initial-scan and final processing according to embodiments of the invention.

FIG. 4 illustrates the edge detection step of the initial-scan processing according to embodiments of the invention.

FIG. 5 illustrates an exemplary kernel for the edge detection filter which may be employed in the edge detection step.

FIG. 6 illustrates the step of detecting possible film slots of the initial-scan processing according to embodiments of the invention.

FIG. 7 illustrates the step of identifying true film slots of the initial-scan processing according to embodiments of the invention.

FIG. 8 illustrates the step of identifying film areas of the initial-scan processing according to embodiments of the invention.

FIG. 9 illustrates an index page generated in the final processing according to embodiments of the invention.

DESCRIPTION OF THE PREFERRED EMBODIMENTS

Figure 1:
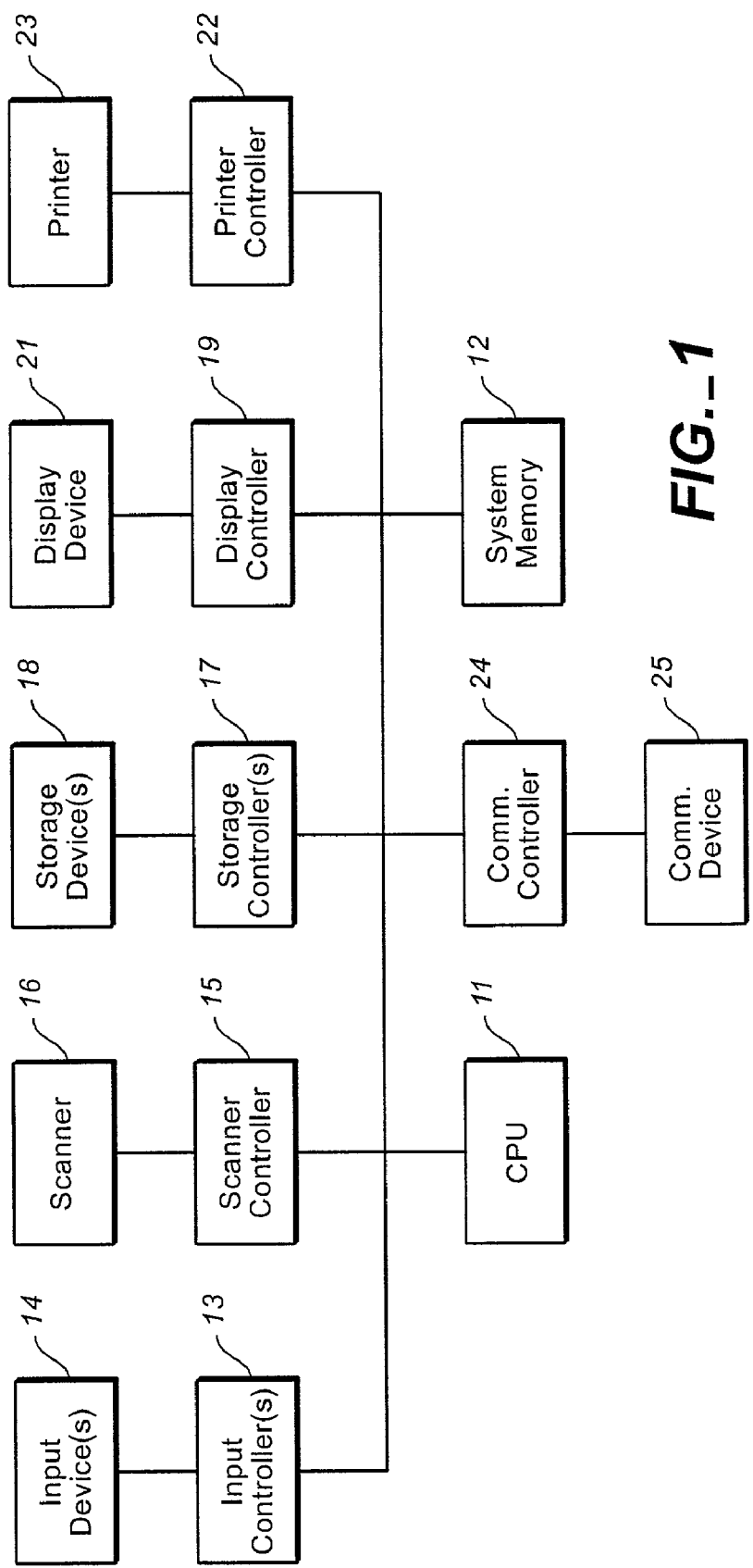
FIG. 1 is a block diagram illustrating components in an exemplary image reproduction system that may be used to implement aspects of the present invention.

FIG. 1 illustrates components in a typical image reproduction system 10 in which the techniques of the present invention can be employed. As illustrated in FIG. 1, the system includes a central processing unit (CPU) 11 that provides computing resources and controls the computer. CPU 11 may be implemented with a microprocessor or the like, and may also include a graphics processor and/or a floating point coprocessor for mathematical computations. System 10 further includes system memory 12 which may be in the form of random-access memory (RAM) and read-only memory (ROM).

A number of controllers and peripheral devices are also provided, as shown in FIG. 1. Each input controller 13 represents an interface to one or more input devices 14, such as a keyboard, mouse or stylus. There is also a controller 15 which communicates with a scanner 16 or equivalent device for digitizing photographic images. One or more storage controllers 17 interface with one or more storage devices 18 each of which includes a storage medium such as magnetic tape or disk, or an optical medium that may be used to record programs of instructions for operating systems, utilities and applications which may include embodiments of programs that implement various aspects of the present invention. Storage device(s) 18 may also be used to store data to be processed in accordance with the invention. A display controller 19 provides an interface to a display device 21 which may be a cathode ray tube (CRT) or thin film transistor (TFT) display. A printer controller 22 is also provided for communicating with a printer 23 for printing photographic images processed in accordance with the invention. A communications controller 24 interfaces with a communication device 25 which enables system 10 to connect to remote devices through any of a variety of networks including the Internet, a local area network (LAN), a wide area network (WAN), or through suitable electromagnetic carrier signals including infrared signals.

In the illustrated embodiment, all major system components connect to bus 26 which may represent more than one physical bus. For example, some personal computers incorporate only a so-called Industry Standard Architecture (ISA) bus. Other computers incorporate an ISA bus as well as a higher bandwidth bus.

While all system components may be located in physical proximity to one another, such is not a requirement of the invention. For example, the scanner, the printer, or both may be located remotely of processor 11. Also, programs that implement various aspects of this invention may be accessed from a remote location (e.g., a server) over a network. Thus, scanned data, data to be printed, or software embodying a program that implements various aspects of the invention may be conveyed to processor 11 through any of a variety of machine-readable medium including magnetic tape or disk or optical disc, any of which may be used to implement system memory 12 or storage device(s) 18, network signals or other suitable electromagnetic carrier signals including infrared signals.

Overview

The photo extraction technique of the present invention directs scanner 16 to scan individual black & white (b & w) or color photos from negative or positive 35 mm or 4×6 in. film. With this technique, all such film types and sizes can be accommodated. Moreover, although the technique is primarily designed for film, and in particular negative film, the technique will also work with slides. In much of the following discussion negative film is taken to be the scanned medium.

The negatives 32 are placed in a standard film holder 31, as shown in FIG. 2. This assembly (i.e., the holder 31 with the negatives 32 contained therein) is then placed on the scanner bed. A low-resolution, color scan of the negatives and the holder is taken by scanner 16 and the low-resolution representation is stored (e.g., in system memory 12 or a storage device 18). In one embodiment, this low-resolution scan is done at a resolution of 96 dots per inch (dpi), although other resolutions may be used. The trade-off here is speed vs. more accurate downstream processing, such as in more accurately locating individual photos and more accurately determining orientations. Also, although the final scan resolution is not limited and only affects the resolution of the final output image, the quality of the final output will reflect any inaccuracies of the initial-scan calculations. A 96 dpi resolution initial-scan seems to be a reasonable compromise, taking into account these considerations.

The photo extraction technique processes the digital representation of the low-resolution scan of the film and holder, prints an index page comprising thumbnails for all of the individual photos found in the film, and uses the information gathered about the size and position of each photo to direct the scanner to scan desired photos at high-resolution for printing. In the course of processing the low-resolution representation (i.e., the initial-scan processing), the photo extraction technique automatically detects the type of film (e.g., 35 mm, 4×6 in., etc.) and automatically corrects for crooked placing of the holder on the scanner bed, so the technique requires minimal manual input. Once the film is placed in the holder and the holder on the scanner bed, the technique may be implemented so that the only other user input required is the indexes of the photos to be printed in high-resolution.

For ease of description and understanding, the processing of the initial-scan representation can be divided into eight steps. The boundaries of these steps have been defined herein for the convenience of description. Alternate boundaries may be defined so long as the specified functions and relationships thereof are appropriately performed.

Once the individual photos have been found in the initial-scan processing, an index print can be made and user-selected photos can be scanned and printed in higher resolution.

The eight steps of initial-scan processing are described below in the context of a color digital representation. These steps are also illustrated in the flow diagram of FIG. 3.

Initial-scan Processing

1. Fill Edges

First, in step 301, some pixels on or near the borders (e.g., pixels in 1–3 of the outer-most rows and columns) of the low-resolution digital representation 30 are made black. This ensures that any light areas are inside the holder and not outside. This greatly reduces the amount of variation, aiding in the automatic detection of photo size and of the actual film-holding areas 33 of the initial-scan while reducing the amount of processing necessary to do so.

2. Smoothen

In step 302, one color channel of the altered low-resolution representation is isolated, smoothened, and stored in a separate buffer. Of the three channels in an RGB color representation, it was experimentally determined that red is the most reliable indicator of the difference between the solid portion of the film-holder 31 and openings in the holder including areas 33 that may contain film. Thus, preferably the red channel is isolated, smoothened, and stored in this step. Each channel typically comprises an 8 bit/pixel stream of data for a total of 24 bits/pixel, although other resolutions are possible. In any case, using only one channel of data reduces the processing necessary at this step while maintaining reliability.

The "smoothen filter" is a linear filter that is used to eliminate noise in the low-resolution representation that might slow down the processing during later steps, such as steps 304 and 305, of the technique. The smoothen filter eliminates many of the edges that would otherwise appear in the edge detection step (step 303), but does not eliminate any of the edges that represent boundaries of areas that may contain film.

The smoothen filter smoothens one channel (e.g., the red channel) of data of the low-resolution representation as the filter transfers the data from its input buffer to its output buffer. Each of the buffers can be implemented, for example, as an area of system memory 16, a high-speed area of storage in storage device 18, or other functionally equivalent way. Each output pixel is determined by the weighted average of it (pre-filtered) and each of the pixels in a pre-defined neighborhood. The size of the pre-defined neighborhood and the weight to be assigned to each input pixel are determined by a pre-defined kernel. The m×n kernel to be used depends on the initial-scan resolution. In one embodiment, a 3×3 kernel of all 1's, where the output pixel value is the average of the input pixel and its eight adjacent neighbors, is used. Depending on the weighting, the smoothened channel may be converted from an n bits/pixel data stream to an m bits/pixel data stream.

An unadulterated copy of the low-resolution representation must still be stored so that the thumbnails of the photos can be extracted once their positions have been determined. Safeguards in later stages compensate for slight errors that may be introduced here that effect the detection of the exact location of edges.

3. Detect Edges

In step 303, the low-resolution representation from step 302 is reduced to binary data, and an edge detector reduces the resulting binary data to only the critical information (e.g., boundary lines 30*a* around the openings including areas for holding the film 33). The photo extraction technique examines the data for the distinctive edges that represent the slightly rough outlines of the film-holding areas 33 within the holder. This step is illustrated in FIG. 4, which shows the holder data being reduced to boundary lines 34, some of which define film-holding areas 33.

Reducing the low-resolution representation to binary data (e.g., b & w) is preferably done by isolating the red channel of the RGB data. It was experimentally determined that the red channel is more robust in locating the film-holding areas than either of the other two channels. The actual threshold value used to determine whether a given pixel is to be black or white may vary, but the inventors have used a value of 35 (on a scale of 0 to 255). Any pixel whose 24-bit RGB color value has a red value below the threshold value (e.g., 35) is assumed to be in a non-film-holding area and is therefore made black. Any pixel with a red value above the threshold value is likely to be in a film-holding area and is therefore made white.

For convenience, the edge detector can be implemented as an edge detection filter which can be the same as the smoothen filter except for the kernel it uses. However, other functionally equivalent edge detection filters may be used. As with the smoothen filter, the m×n size of the edge detection filter kernel depends on the resolution of the representation. In one embodiment, the kernel shown in FIG. 5 is used. With this kernel, the value of the output pixel is eight times the value of the corresponding input pixel minus the value of each of the input pixel's adjacent neighbors. Each output pixel value is then made either a 1 or a 0 by applying a threshold test to it. Each pixel having a value greater than zero becomes 1 and each pixel having a value less than or equal to zero becomes 0.

4. Detect Possible Film Slots

The edges detected in step 303 form various connected components. Each connected component may represent a film-holding area 34 of the holder 31 or may represent some artifact 35 of the holder. Areas 34 are distinguished from the artifacts 35 by size and shape in step 304.

One way in which the connected components can be determined is as follows. A row-based, run-length table is created for the edge detector output. Because the data is binary and 1's are sparse, this table is quite compact. A two-pass procedure on this table first links connected segments and then groups the linked segments under unique identifying labels. That is, linked segments are each given the same identifying label to indicate that they belong to the same connected component. Every pixel that had a value of 1 in the input has value replaced with its component's label value, which is an integer between 0 and the total number of components minus one. The total number of components is recorded (e.g., in system memory 12 or storage device 18) for later use.

Film-holding areas 34 can be distinguished by user selection, or by a machine-readable identifier (such as a bar code) on the holder which identifies the type of film holder and the size of the film-holding areas. In other embodiments, the photo extraction technique uses the size and shape of the area under consideration to determine whether it is a film-holding area or not. An area is determined to possibly contain film if it is at least the minimum height and width of the smallest possible film-holding area. Of the two most common holders (35 mm and 4×6 in.), 35 mm holders have a smaller film-holding area (112.5 mm×24 mm). In one embodiment, an area is deemed to contain film if its bounding rectangle (which is defined by the area's maximum and minimum x and y coordinates) contains at least 800× (low-resolution representation (in dpi)/120 dpi) pixels and has a height of at least 3.33 in. FIG. 6 illustrates the results of distinguishing connected components representing film-holding areas 34 from those representing artifacts 35.

5. Identify True Film Slots

Based on the size and shape of the areas 34, the type of film (35 mm or 4×6 in.) can be detected. In step 305, detected film-holding areas 34 are set aside from the unwanted areas (i.e., the rest of the holder), as illustrated in FIG. 7.

Because of the sizes of the film-holding areas in the two most popular holders, a 4×6 in. film area can be distinguished as having a width w and a height h, where 4 in. <w<6 in. and 5 in. <h<6 in, and a 35 mm film area can be distinguished as having a width w and a height h, where 24 mm<w<4 in. and 112.5 mm<h<5 in. These measurements are converted to pixels according to the resolution (in dpi) of the representation. An error margin of a few pixels (e.g., 3 for 96 dpi) ensures that any slight error introduced by the coarse discretization of pixels in the low-resolution representation will not harm the results of the processing.

Having identified true film slots, each of the following steps is carried out for each area that may hold film.

6. Determine and Correct Film Orientation

This is the most time-consuming step. The rotation angle of each film-holding area is found in step 306 by computing the Hough transform of the area's representative line drawing (which can be easily taken from the output of the edge detector). In one embodiment, the Hough transform is used to compute the angle of tilt of each component surrounding a particular film-holding area. The angle of tilt is used to straighten the skewed representation in order to create thumbnail images of the individual photos and will later be used to de-skew the final scan images for printing.

The Hough transform is a well-known technique for changing the basis of a digital representation by mapping lines in the representation to points. Each pixel in a given component's outline is considered, and in particular each line in the representation passing through that pixel and having a slope between 0° and 360° and a multiple of dθ, which is 0.25° in one embodiment, is considered. Each such line, which may pass through one or more pixels, is given a number of "votes" equal to the number of pixels through which the line passes. line through each pixel pair is determined and is recorded as one vote. The component's angle is determined from the slope of the line that has the most votes. All other output of the Hough Transform module is ignored.

Accuracy of the Hough Transform's output can be sacrificed for speed, if desired. One way to do this is to increase dθ. Another way to do this is by sub-sampling the pixels of a component to reduce the amount of computation. There are also other, less robust ways of determining the skew angle. For example, it may be deemed unnecessary to compute the skew angle of each component individually because they should all be in the same orientation in the holder. In fact, depending on the accuracy desired, other suitable skew detection algorithms could be used instead of the Hough Transform.

Assuming that the Hough Transform is employed, thereafter a new buffer is created to hold the de-skewed image data of the film-holding section corresponding to the component. This buffer, which may be a portion of system memory 12, is reused for each component. The value of each pixel in the de-skewed component is determined by using trigonometry to locate its coordinates in the skewed image from its new coordinates and the skew angle, which the Hough Transform has computed. Because the computed coordinates of a pixel in the skewed image may not be integers, it is not possible in general to simply transplant each individual pixel from the skewed image to the de-skewed image. Each pixel can be transplanted by taking the pixel that is the closest match to the computed value of its coordinates or by taking a weighted average of the pixels (up to four pixels) surrounding the calculated non-integral coordinates. The latter method might lead to higher quality in the de-skewed image, but since the preservation of image quality at this stage affects only the thumbnail display, it is only of moderate importance and is not crucial to performance of later processing.

With coordinates for the boundaries of a film-holding area and its angle of rotation, the photo extraction technique straightens the area relative to its orientation in the low-resolution representation and copies it (preferably, in 24-bit color) into a temporary buffer, which may be a portion of system memory 12, for further processing. After rotation, the film's longer dimension is vertical and the shorter dimension is horizontal. For 35 mm film, this dimension of the film is referred to as its width, not its height.

Any reasonable angle (say ±10°) of crookedness in the low-resolution representation can be corrected. The limitation on the size of the angle lies not in this step, but later, in the final scan of the desired photo. If the angle is too great, the final scan will require more lines of buffer space than may be available. For one row of width w pixels of straightened output to be produced from a scan at angle θ, w×sin(θ) lines of buffer are required. If only a few rows are available, the photo extraction technique can determine here that it will require that the film holder be manually straightened and that another initial-scan be attempted, thus preventing wasted downstream processing.

7. Identify Film Areas

The de-skewed components usually need to be cropped down since unwanted borders may exist as an artifact of the rotation. This is step 307 in the process and is illustrated in FIG. 8. The cropping algorithm simply attempts to find an area defined by each component that is 24 mm (or 4 in. in the case of 4×6 in. film) wide and of variable height (or 5 in. in the case of 4×6 in. film), which represents the film. Once the film has been isolated, the photos can be found.

The algorithm determines the cropping coordinates of each de-skewed component as follows. It finds the first and last horizontal line segments having a length substantially equal to the width of the film (24 mm or 4 in.) translated into pixels, depending on the initial-scan resolution, that fall within the color range of the film. The range used by the inventors is 70<R+G+B<620. The beginnings and endings of these two segments are respectively averaged to yield the lower and upper bound x-coordinates for cropping.

With the vertical boundaries of the cropping determined, the horizontal boundaries need to be found. This is done by checking the vertical line that runs in the center of the vertical crop lines. The first and last vertical line segments along this line that contain the number of pixels equivalent to the length of the picture (36 mm or 5 in., depending on the film type detected) within the color range for the film are found. The horizontal boundaries are thus determined. If the algorithm has failed to yield a reasonable area (i.e., the area is too small in either width or height to be a photo), the component is discarded as containing no film.

8. Find Photos

In step 308, the individual photos are found. In the case of 4×6 in. film, each film-holding area represents only one photo, so the photo is trivially extracted from the holder. The previous cropping ensures that no part of the film holder is included in any final printout of the photo. This cropping amounts to no more than a few pixels on each edge and accounts for blending of pixels in the low resolution representation as well as possible discrepancies in placement between the first and final scans.

For 35 mm film, the convention is that the viewable image is 24×36 mm. However, to accommodate slight variations between cameras, all specific values are given a margin of error of a few pixels (3 in the case of a 96 dpi initial-scan resolution) to ensure that the photo borders do not appear in the final scan. Any scratches, holes, etc. are colored in with the color of unexposed film so that they do not interfere with the detection. In the case of 35 mm film, many photos may sit side-by-side on one section of film. Thus, the individual photos must be separated from one another.

Each horizontal band that is within a certain tolerance of lightness so as to be considered unexposed film is marked. The photo extraction technique searches for possible locations of photos by deciding which groups of bands represent the space between photos. Considered in this calculation are the widths and alignment of the groups. Each photo is copied into a collective buffer, which may be implemented in system memory 12, from where it will be accessed to create the index print. The location of each frame in the initial scan is stored for quick retrieval in case the user should desire to re-scan and print it in high resolution.

More specifically, a "find photos" algorithm is employed which takes the straightened and cropped film and attempts to break it up into separate photos. In the case of 4×6 in. film, there is only one photo to find and it is simply extracted. 35 mm film is more difficult because the number of photos on the section of film is usually unknown.

For 35 mm film, "find photos" first scans through the film in horizontal rows. Any row with an average R+G+B value below 70 (same threshold as above in crop frame) is replaced with a row of pixels with RGB values (R, G, B), which are experimentally determined and can be tuned to a particular scanner, scanner setting, and film type. While actual R, G, B values will vary depending on the type of film and scanner, in one embodiment, for 35 mm, 200 speed Kodak® film, R=249, G=184 and B=150 provided good results. This row replacement step is intended to combat an error that may be introduced when glare from the scanner causes two adjacent film sections to be interpreted as one large section.

Now each color channel of row is considered again. If its average pixel value is above 99% of the experimentally determined color (for that channel) of unexposed film, it is marked as a possible border between frames. Since the space between frames is typically about 1.5 mm, the algorithm searches for contiguous blocks of about that size to determine which of the candidates are the true borders between the photos. Since the size of the borders can vary from camera to camera and are not necessarily precise, some flexibility is preferably built in to this aspect of the algorithm.

The positions of the photos are found as follows. First, the film is examined lengthwise. Any location before a candidate border row is considered a possible "finish" location for a photo. Any location after a candidate border row is considered a possible "start" location of a photo. The algorithm searches for a set of "starts" and "finishes" that do not overlap, and where each "start" is followed by a "finish" 36 mm down film and each "finish" (except the last one) is followed by a "start" 1.5 mm down film.

To obtain this set, the algorithm searches for the first "start" location that has a "finish" 36 mm (give or take the error margin) after it. Once this has been found, the algorithm looks back up through the film to find the first photo on the roll. The algorithm attempts to adaptively detect the starting and finishing locations of photos, but if they can not be found, the default values of 36 mm and 1.5 mm are used. Each photo's location is recorded and each photo is copied into a buffer of thumbnails. These can be sorted as desired to create an index page for directing the final scan.

Final Processing

Now that each photo has been indexed and stored as a thumbnail, an index page can be prepared in step 309. As illustrated in FIG. 9, this index can be one printed page showing thumbnails of all the photos along with their index numbers. This page, designed to be output to printer 23, is prepared line-by-line, so very little memory is required. Alternatively, or in addition to printing, the index page can be displayed on display device 21.

The user looks at the index page and decides which photos are to be printed in high resolution. The user then selects the index or indices and resolution for the final scans. The photo extraction technique directs the scanner 16 to scan each desired frame from the negatives in the film holder on the scanner bed, straightens and prints each photo using the angle and position data determined from the initial-scan processing. Note that this assumes that the film holder on the scanner bed has not shifted since the initial scan was taken.

When a particular photo is selected to be re-scanned in high resolution, the coordinates of its corners from the initial-scan are scaled into coordinates in the new, higher resolution. The scanner 16 is directed to scan only lines that contain data relevant to the photo. A buffer, which may be in system memory 12, collects these lines.

As soon as the buffer contains all the data for one row of output (because the input data is skewed and the output is de-skewed), that row is rotated and output to the printer pipeline. New lines are read into the buffer until another line may be output. As the buffer fills up, old data is dumped out and new data fed in. It is possible that the overwritten lines still contain data that has not yet been output to the printer. This case is avoided not by explicit checking, but by calculating whether the buffer's size is large enough to hold one entire line of output. If so, no error will usually result from overwriting. If not, the angle of skew is too great, in which case the user is prompted to choose a lower resolution or to manually straighten the film holder and try again. Because this depends only on the final-scan resolution and angle of skew, the technique can be configured to abort its procedure as soon as it knows the angle and the output resolution. The earliest possible time, therefore, is at step 306. If the program terminates there, much time can be saved.

Effects and Implementations

As the foregoing description demonstrates, the present invention provides an efficient and easy to use photo extraction technique which may be conveniently implemented using a scanner and software running on a personal computer or other processing device. Each of the various buffers mentioned above may be conveniently implemented as portions of system memory 12 or a high speed area of a storage medium of storage device 18. The photo extraction technique may also be implemented with hardware components, such as discrete logic circuits, one or more application specific integrated circuits (ASICs), digital signal processors, program-controlled processors, or the like. A combination of software and hardware may also be used to implement the photo extraction technique.

With these implementation alternatives in mind, it is to be understood that the block and flow diagrams show the performance of certain specified functions and relationships thereof. The boundaries of these functional blocks have been defined herein for convenience of description. Alternate boundaries may be defined so long as the specified functions are performed and relationships therebetween are appropriately maintained. The diagrams and accompanying description provide the functional information one skilled in the art would require to write program code (i.e., software) or to fabricate circuits (i.e., hardware) to perform the processing required.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for extracting individual images from a medium containing one or more areas, comprising the steps of:
    (a) scanning the medium at a relatively low resolution to generate a low-resolution digital representation of the medium and the individual images thereon;
    (b) processing the low-resolution digital representation by performing the following operations without user intervention:
        (b)(1) defining borders of the medium, such that all of the individual images are within the defined borders;
        (b)(2) applying a smoothen filter to the low-resolution representation;

(b)(3) detecting edges of each area containing at least one image;

(b)(4) determining, and if necessary correcting, the orientation of the medium; and (b)(5) locating each of the individual images within its corresponding area in the medium;

(c) generating an index of all individual images identified on the medium;

(d) selecting one or more of the individual images from the index; and (e) re-scanning only the selected individual images within the medium at a relatively high resolution;

wherein the low-resolution digital representation is an RGB color representation, and wherein step (b)(2) comprises applying the smoothen filter to only the R data of each pixel in the low-resolution representation.

2. The method of claim 1, further comprising the step of:

(f) generating a high-resolution output of each of the selected individual images.

3. The method of claim 1, wherein the medium comprises at least one of negative film, positive film, and slides.

4. The method of claim 1, wherein the index comprises a collection of thumbnail images.

5. A method for extracting individual images from a medium contained in a holder having image-holding areas, comprising the steps of:

(a) scanning the medium and the holder at a relatively low resolution to generate a low-resolution digital representation of the holder and the medium including the individual images thereon;

(b) processing the low-resolution digital representation by performing the following operations without user intervention:

(b)(1) defining borders of the holder, such that all of the image-holding areas and all of the individual images contained therein are within the defined borders;

(b)(2) applying a smoothen filter to the low-resolution representation;

(b)(3) detecting edge segments of the image-holding areas;

(b)(4) detecting and identifying each of the image-holding areas;

(b)(5) determining the orientation of at least one image-holding area with respect to a reference, and (b)(5)(i) if it is determined that the at least one image-holding area is skewed with respect to the reference, correcting the orientation of the at least one image-holding area; and (b)(6) locating each of the individual images within the image-holding areas;

(c) generating an index of all individual images identified on the medium;

(d) selecting one or more of the individual images from the index; and (e) re-scanning only the selected individual images on the medium at a relatively high resolution;

wherein the low-resolution digital representation is a RGB color representation, and wherein step (b)(2) comprises applying the smoothen filter to only the R data of each pixel in the low-resolution representation.

6. The method of claim 5, further comprising the steps of:

(f) generating a high-resolution output of each of the selected individual images.

7. The method of claim 5, wherein the medium comprises at least one of negative film, positive film, and slides.

8. The method of claim 5, wherein the index comprises a collection of thumbnail images.

9. The method of claim 5, wherein step (b)(1) comprises darkening pixels in, or within a predetermined distance from, the outer-most row/column of pixels representing the holder.

10. The method of claim 5, wherein each output pixel of the smoothen filter is determined by the weighted average of the pre-filtered version of that pixel and each of the pixels in a pre-defined neighborhood.

11. The method of claim 5, wherein step (b)(3) comprises reducing the low-resolution representation to binary data, and then reducing the binary data to boundaries of the image-holding areas.

12. The method of claim 5, wherein step (b)(3) comprises applying an edge detector to the low-resolution representation, wherein each output pixel of the edge detector is determined by a pre-defined edge-detecting-filter kernel, and then applying a threshold test to each output pixel to determine whether that output pixel is above or below a pre-determined threshold, and making that output pixel either a 1 or a 0 based on the result of the threshold test.

13. The method of claim 5, wherein step (b)(4) comprises distinguishing the detected edge segments of the image-holding areas from all artifacts that resemble an image-holding-area edge segment, identifying groups of connected edge segments, and identifying each of the image-holding areas from the size and shape of the corresponding group of connected edge segments.

14. The method of claim 5, wherein step (b)(5) comprises computing the rotation angle of the at least one image-holding area with respect to the reference by computing the Hough transform of a representative line drawing of that image-holding area.

15. The method of claim 5, wherein step (b)(5) comprises computing the rotation angle of each image-holding area with respect to the reference by computing the Hough transform of a representative line drawing of that image-holding area.

16. The method of claim 5, wherein step (b)(6) comprises identifying boundaries of the medium in each of the identified image-holding areas.

17. The method of claim 17, wherein step (b)(6) further comprises identifying boundaries of each individual image.

18. An apparatus for extracting individual images from a medium contained in a holder having image-holding areas, comprising:

a scanner for scanning the medium and the holder at a relatively low resolution to generate a low-resolution digital representation of the holder and the medium including the individual images thereon;

a storage medium in communication with the scanner for storing the low-resolution representation;

means in communication with the storage medium for processing the low-resolution digital representation, the processing means including:

means for defining borders of the holder, such that all of the image-holding areas and all of the individual images contained therein are within the defined borders;

means for applying a smoothen filter to the low-resolution representation;

means for detecting edge segments of the image-holding areas;

means for detecting and identifying each of the image-holding areas;

means for determining the orientation of at least one image-holding area with respect to a reference, and, if it is determined that the at least one image-holding area is skewed with respect to the reference, for correcting the orientation of the at least one image-holding area; and means for locating each of the individual images within the image-holding areas;

means for generating an index of all individual images identified on the medium; and means for selecting one or more of the individual images from the index;

wherein the scanner re-scans only the selected individual images on the holder and medium at a relatively high resolution; and wherein each of the border defining means, smoothen filter applying means, edge segments detecting means, image-holding areas detecting and identifying means, orientation determining means and individual image locating means is configured to perform its operation without user intervention;

wherein the low-resolution digital representation is a RGB color representation, and wherein the smoothen filter applying means applies the smoothen filter to only the R data of each pixel in the low-resolution representation.

19. The apparatus of claim 18, further comprising:
means for generating a high-resolution output of each of the selected individual images.

20. The apparatus of claim 18, wherein the medium comprises at least one of negative film, positive film, and slides.

21. The apparatus of claim 18, wherein the index comprises a collection of thumbnail images.

22. The apparatus of claim 18, wherein the border-defining means darkens pixels in, or within a predetermined distance from, the outer-most row/column of pixels representing the holder.

23. The apparatus of claim 18, wherein each output pixel of the smoothen filter is determined by the weighted average of the pre-filtered version of that pixel and each of the pixels in a pre-defined neighborhood.

24. The apparatus of claim 18, wherein the edge-segments-detecting means reduces the low-resolution representation to binary data, and then reducing the binary data to boundaries of the image-holding areas.

25. The apparatus of claim 18, wherein the edge-segments-detecting means applies an edge detector to the low-resolution representation, wherein each output pixel of the edge detector is determined by a pre-defined edge-detecting-filter kernel, and then applying a threshold test to each output pixel to determine whether that output pixel is above or below a pre-determined threshold, and making that output pixel either a 1 or a 0 based on the result of the threshold test.

26. The apparatus of claim 18, wherein the detecting and identifying means distinguishes the detected edge segments of the image-holding areas from all artifacts that resemble an image-holding-area edge segment, identifying groups of connected edge segments, and identifying each of the image-holding areas from the size and shape of the corresponding group of connected edge segments.

27. The apparatus of claim 18, wherein the orientation-determining-and-correcting means computes the rotation angle of the at least one image-holding area with respect to the reference by computing the Hough transform of a representative line drawing of that image-holding area.

28. The apparatus of claim 18, wherein the orientation-determining-and-correcting means computes the rotation angle of each image-holding area with respect to the reference by computing the Hough transform of a representative line drawing of that image-holding area.

29. The apparatus of claim 18, wherein the locating means identifies boundaries of the medium in each of the identified image-holding areas.

30. The apparatus of claim 29, wherein the locating means further identifies boundaries of each individual image.

31. A machine-readable medium having a program of instructions for directing a machine to extract images from a medium containing one or more areas, the program of instructions comprising instructions for:
(a) scanning the medium at a relatively low resolution to generate a low-resolution digital representation of the medium and the individual images thereon;
(b) processing the low-resolution digital representation by performing the following operations without user intervention:
(b)(1) defining borders of the medium, such that all of the individual images are within the defined borders;
(b)(2) applying a smoothen filter to the low-resolution representation;
(b)(3) detecting edges of each area containing at least one image;
(b)(4) determining, and if necessary correcting, the orientation of the medium; and
(b)(5) locating each of the individual images within its corresponding area in the medium;
(c) generating an index of all individual images identified on the medium;
(d) selecting one or more of the individual images from the index;
(e) re-scanning only the selected individual images on the medium containing areas at a relatively high resolution;
wherein the low-resolution digital representation is an RGB color representation, and wherein step (b)(2) comprises applying the smoothen filter to only the R data of each pixel in the low-resolution representation.

32. The machine-readable medium of claim 31, further comprising instructions for:
(f) generating a high-resolution output of each of the selected individual images.

33. The machine-readable medium of claim 31, wherein the medium comprises at least one of negative film, positive film, and slides.

34. The machine-readable medium of claim 31, wherein the index comprises a collection of thumbnail images.

35. A machine-readable medium having a program of instructions for directing a machine to extract individual images from a medium contained in a holder having image-holding areas, comprising instructions for:
(a) scanning the medium and the holder at a relatively low resolution to generate a low-resolution digital representation of the holder and the medium including the individual images thereon;
(b) processing the low-resolution digital representation by performing the following operations without user intervention:
(b)(1) defining borders of the holder, such that all of the image-holding areas and all of the individual images contained therein are within the defined borders;
(b)(2) applying a smoothen filter to the low-resolution representation;
(b)(3) detecting edge segments of the image-holding areas;
(b)(4) detecting and identifying each of the image-holding areas;

(b)(5) determining the orientation of at least one image-holding area with respect to a reference, and
  (b)(5)(i) if it is determined that the at least one image-holding area is skewed with respect to the reference, correcting the orientation of the at least one image-holding area; and
(b)(6) locating each of the individual images within the image-holding areas;
(c) generating an index of all individual images identified on the medium;
(d) selecting one or more of the individual images from the index;
(e) re-scanning only the selected individual images on the medium contained in the holder at a relatively high resolution;
wherein the low-resolution digital representation is a RGB color representation, and wherein instruction (b)(2) comprises applying the smoothen filter to only the R data of each pixel in the low-resolution representation.

36. The machine-readable medium of claim 35, further comprising instructions for:
(f) generating a high-resolution output of each of the selected individual images.

37. The machine-readable medium of claim 35, wherein the medium comprises at least one of negative film, positive film, and slides.

38. The machine-readable medium of claim 35, wherein the index comprises a collection of thumbnail images.

39. The machine-readable medium of claim 35, wherein instruction (b)(1) comprises darkening pixels in, or within a predetermined distance from, the outer-most row/column of pixels representing the holder.

40. The machine-readable medium of claim 35, wherein each output pixel of the smoothen filter is determined by the weighted average of the pre-filtered version of that pixel and each of the pixels in a pre-defined neighborhood.

41. The machine-readable medium of claim 35, wherein instruction (b)(3) comprises reducing the low-resolution representation to binary data, and then reducing the binary data to boundaries of the image-holding areas.

42. The machine-readable medium of claim 35, wherein instruction (b)(3) comprises applying an edge detector to the low-resolution representation, wherein each output pixel of the edge detector is determined by a pre-defined edge-detecting-filter kernel, and then applying a threshold test to each output pixel to determine whether that output pixel is above or below a pre-determined threshold, and making that output pixel either a 1 or a 0 based on the result of the threshold test.

43. The machine-readable medium of claim 35, wherein instruction (b)(4) comprises distinguishing the detected edge segments of the image-holding areas from all artifacts that resemble an image-holding-area edge segment, identifying groups of connected edge segments, and identifying each of the image-holding areas from the size and shape of the corresponding group of connected edge segments.

44. The machine-readable medium of claim 35, wherein instruction (b)(5) comprises computing the rotation angle of the at least one image-holding area with respect to the reference by computing the Hough transform of a representative line drawing of that image-holding area.

45. The machine-readable medium of claim 35, wherein instruction (b)(5) comprises computing the rotation angle of each image-holding area with respect to the reference by computing the Hough transform of a representative line drawing of that image-holding area.

46. The machine-readable medium of claim 35, wherein instruction (b)(6) comprises identifying boundaries of the medium in each of the identified image-holding areas.

47. The machine-readable medium of claim 46, wherein instruction (b)(6) further comprises identifying boundaries of each individual image.

* * * * *